US008849016B2

(12) United States Patent
Chen et al.

(10) Patent No.: US 8,849,016 B2
(45) Date of Patent: Sep. 30, 2014

(54) PANORAMIC IMAGE GENERATION FROM CBCT DENTAL IMAGES (75) Inventors: Shoupu Chen, Rochester, NY (US); Lawrence A. Ray, Rochester, NY (US); Jean-Marc Inglese, Bussy Saint Georges (FR)

(73) Assignee: Carestream Health, Inc., Rochester, NY (US)

( * ) Notice: Subject to any disclaimer, the term of this patent is extended or adjusted under 35 U.S.C. 154(b) by 159 days.

(21) Appl. No.: 13/290,196

(22) Filed: Nov. 7, 2011

(65) Prior Publication Data

US 2013/0022252 A1    Jan. 24, 2013

Related U.S. Application Data (63) Continuation-in-part of application No. 13/187,596, filed on Jul. 21, 2011.

(51) Int. Cl.
*G06K 9/00* (2006.01)

(52) U.S. Cl.
USPC .......................................................... 382/154

(58) Field of Classification Search
USPC ......................................... 382/128–134, 154
See application file for complete search history.

(56) References Cited

U.S. PATENT DOCUMENTS

| 5,431,562 | A |  | 7/1995 | Andreiko et al. |
|---|---|---|---|---|
| 6,210,162 | B1 |  | 4/2001 | Chishti et al. |
| 6,409,504 | B1 | * | 6/2002 | Jones et al. ............... 433/24 |
| 7,317,819 | B2 | * | 1/2008 | Janes ............................ 382/128 |
| 7,324,661 | B2 |  | 1/2008 | Kemp et al. |
| 7,460,709 | B2 |  | 12/2008 | Grady |
| 8,244,017 | B2 | * | 8/2012 | Chun et al. ................... 382/131 |
| 8,253,778 | B2 | * | 8/2012 | Atsushi ........................... 348/42 |
| 8,594,428 | B2 |  | 11/2013 | Aharoni et al. |
| 8,605,973 | B2 |  | 12/2013 | Wang et al. |
| 8,761,493 | B2 |  | 6/2014 | Chen et al. |
| 2004/0175671 | A1 |  | 9/2004 | Jones et al. |
| 2004/0227750 | A1 |  | 11/2004 | Su et al. |
| 2006/0029275 | A1 |  | 2/2006 | Li et al. |
| 2006/0147872 | A1 |  | 7/2006 | Andreiko |

(Continued)

FOREIGN PATENT DOCUMENTS

WO    WO 2008/092009    7/2008

OTHER PUBLICATIONS

M Sadeghi, G. Tien, G. Hamarneh, M.S. Atkins, "Hands-free Interactive Image Segmentation Using Eyegaze", SPIE Medical Imaging 2009, vol. 7260, pp. 72601H1-72601H10.

(Continued)

*Primary Examiner* — Alex Liew (57) ABSTRACT

A method for forming a panoramic image from a computed tomography image volume, acquires image data elements for one or more computed tomographic volume images of a subject, identifies a subset of the acquired computed tomographic images that contain one or more features of interest and defines, from the subset of the acquired computed tomographic images, a sub-volume having a curved shape that includes one or more of the contained features of interest. The curved shape is unfolded by defining a set of unfold lines wherein each unfold line extends at least between two curved surfaces of the curved shape sub-volume and re-aligning the image data elements within the curved shape sub-volume according to a re-alignment of the unfold lines. One or more views of the unfolded sub-volume are displayed.

13 Claims, 12 Drawing Sheets

(56) References Cited

U.S. PATENT DOCUMENTS

| | | |
|---|---|---|
| 2006/0227131 A1 | 10/2006 | Schiwietz et al. |
| 2007/0127801 A1* | 6/2007 | Kalke .......................... 382/131 |
| 2008/0118143 A1 | 5/2008 | Gordon et al. |
| 2008/0136820 A1 | 6/2008 | Yang et al. |
| 2008/0232539 A1* | 9/2008 | Pasini et al. ...................... 378/4 |
| 2008/0310716 A1 | 12/2008 | Jolly et al. |
| 2009/0003672 A1 | 1/2009 | Maier et al. |
| 2009/0097727 A1 | 4/2009 | Jolly et al. |
| 2010/0278299 A1 | 11/2010 | Loustauneau et al. |

OTHER PUBLICATIONS

Marie-Pierre Jolly, Leo Grad, "3D general lesion segmentation in CT", ISBI 2008, pp. 796-799.

Vladimir Vezhnevets, and Vadim Konouchine, "GrowCut—Interactive Multi-Label N-D Image Segmentation by Cellular Automata,", *Int'l. Conf. Computer Graphics and Vision 2005*, 7 pages.

R.L. Graham, "An Efficient Algorithm for Determining the Convex Hull of a Finite Planar Set", Jan. 28, 1972, Information Processing Letters 1 (1972) pp. 132-133, North-Holland Publishing Company.

Hong Chen, et al., "Tooth Contour Extraction for Matching Dental Radiographs," Pattern Recognition 2004 ICPR 2004 Proceedings of the 17th International Conference, 4 pages.

T.K. Schleyer, et al., "A Preliminary Analysis of the Dental Informatics Literature," Adv Dent Res, 17, pp. 20-24, Dec. 2003.

S.Y.Lee, et al., "Development of a Digital Panoramic X-ray Imaging System for Dental Applications," 2007 IEEE Nuclear Science Symposium Conference Record, vol. 4, pp. 2987-2990, 2007.

Krsek et al., "Teeth and jaw 3D reconstruction in stomatology", *Proceedings of the International Conference on Medical Information Visualisation—BioMedical Visualisation*, pp. 23-28, 2007.

Shah et al. "Automatic tooth segmentation using active contour without edges", 2006, IEEE Biometrics Symposium, 6 pages.

Akhoondali et al., "Rapid Automatic Segmentation and Visualization of Teeth in CT-Scan Data", *Journal of Applied Sciences*, pp. 2031-2044, 2009.

Gao et al., "Automatic Tooth Region Separation for Dental CT Images", *Proceedings of the 2008 Third International Conference on Convergence and Hybrid Information Technology*, pp. 897-901, (2008).

International Search Report mailed Oct. 30, 2012 for International Patent Application No. PCT/US2012/047265, 11 pages.

International Search Report mailed Jan. 30, 2013 for International Application No. PCT/US2012/047268, 3 pages.

Sinop et al., "A Seeded Image Segmentation Framework Unifying Graph Cuts and Random Walker which Yields a New Algorithm," ICCV, 2007, pp. 1-8.

* cited by examiner

PANORAMIC IMAGE GENERATION FROM CBCT DENTAL IMAGES

CROSS-REFERENCE TO RELATED APPLICATIONS

This application is a Continuation-in-Part of commonly assigned copending U.S. patent application U.S. Ser. No. 13/187,596 filed on Jul. 21, 2011 entitled "METHOD AND SYSTEM FOR TOOTH SEGMENTATION IN DENTAL IMAGES" to Chen et al.

FIELD OF THE INVENTION

The present invention relates generally to image processing in x-ray computed tomography and, in particular, to digital CBCT volume three dimensional teeth segmentation.

BACKGROUND OF THE INVENTION

Imaging and image processing for computer-aided diagnosis and improved patient care are areas of growing interest to dental practitioners. Among areas of particular interest and significance for computer-aided diagnosis, treatment assessment, and surgery is image segmentation, particularly for tooth regions.

Various approaches have been proposed in recent years to tackle the tooth segmentation problem. For example, Shah et al. in a study entitled "Automatic tooth segmentation using active contour without edges", 2006, *IEEE Biometrics Symposium*, describe a method for automating postmortem identification of teeth for deceased individuals based on dental characteristics. The method compares the teeth presented in multiple digitized dental records. One important step in such a method is the estimation of the contour of each tooth in order to permit efficient feature extraction. It has been found, however, that extracting the contour of the teeth is a very challenging task. In Shah's method, the task of teeth contour estimation is accomplished using the active contour without edges. This technique is based on the intensity of the overall region of the tooth image. For various reasons, the results shown in the Shah et al. publication demonstrate very limited success in tackling this problem.

In an article entitled "Teeth and jaw 3D reconstruction in stomatology", *Proceedings of the International Conference on Medical Information Visualisation—BioMedical Visualisation*, pp 23-28, 2007, researchers Krsek et al. describe a method dealing with problems of 3D tissue reconstruction in stomatology. In this process, 3D geometry models of teeth and jaw bones were created based on input CT image data. The input discrete CT data were segmented by a nearly automatic procedure, with manual correction and verification. Creation of segmented tissue 3D geometry models was based on vectorization of input discrete data extended by smoothing and decimation. The actual segmentation operation was primarily based on selecting a threshold of Hounsfield Unit values. However, this method fails to be sufficiently robust for practical use.

Akhoondali et al. proposed a fast automatic method for the segmentation and visualization of teeth in multi-slice CT-scan data of the patient's head in an article entitled "Rapid Automatic Segmentation and Visualization of Teeth in CT-Scan Data", *Journal of Applied Sciences*, pp 2031-2044, 2009. The algorithm uses a sequence of processing steps. In the first part, the mandible and maxilla are separated using maximum intensity projection in the y direction and a step like region separation algorithm. In the second part, the dental region is separated from other image content using maximum intensity projection in the z direction, thresholding and cropping. In the third part, the teeth are rapidly segmented using a region-growing algorithm based on four thresholds which are used to distinguish between seed points, teeth, and non-tooth tissue. In the fourth part, the results are visualized using iso-surface extraction and surface and volume rendering. A semi-automatic method is also proposed for rapid metal artifact removal. This method may provide some advantages over earlier solutions. However, in practice, it proves to be difficult to select a total of five different threshold values for a proper segmentation operation. Results obtained from this processing sequence can be disappointing and show poor dissection between the teeth.

In an article entitled "Automatic Tooth Region Separation for Dental CT Images", *Proceedings of the 2008 Third International Conference on Convergence and Hybrid Information Technology*, pp 897-901, (2008), researchers Gao et al. disclose a method to construct and visualize the individual tooth model from CT image sequences for dental diagnosis and treatment. This method attempts to separate teeth for CT images where the teeth touch each other in some slices. The method is to find the individual region for each tooth and separate two teeth if they touch. The researchers proposed a method based on distinguishing features of the oral cavity structure. The method used initially separates upper and lower tooth regions and then fits the dental arch using fourth order polynomial curves, after a series of morphological operations. This assumes that there exists a plane separating two adjacent teeth in 3D space. In this plane, the integral intensity value is at a minimum. A plane is projected along each arch point and the corresponding integral intensity is computed. The resulting values are then used to draw a profile and, by analyzing all the local minima, a separating point and the position of the separating plane can be determined. The position identification of the tooth region can guide the segmentation of the individual both tooth contours in 2D and tooth surface in 3D space. However, results have shown that Gao's method may not separate the teeth correctly in many cases. As can be seen in the article itself, the separation lines in a number of cases cut through the teeth.

Thus, it is seen that there is a need for a method that provides a better solution for teeth position identification in a three dimensional dental image volume for teeth segmentation.

SUMMARY OF THE INVENTION

It is an object of the present invention to advance the art of tooth position identification and segmentation from cone beam CT images. With this object in mind, the present invention provides a method for forming a panoramic image from a computed tomography image volume, the method executed at least in part on a computer and comprising: acquiring image data elements for one or more computed tomographic volume images of a subject; identifying a subset of the acquired computed tomographic images that contain one or more features of interest; defining, from the subset of the acquired computed tomographic images, a sub-volume having a curved shape that includes one or more of the contained features of interest; unfolding the curved shape sub-volume by: (i) defining a set of unfold lines wherein each unfold line extends at least between two curved surfaces of the curved shape sub-volume; (ii) re-aligning the image data elements within the curved shape sub-volume according to a re-alignment of the unfold lines; and displaying one or more views of the unfolded sub-volume.

Embodiments of the present invention, in a synergistic manner, integrate skills of a human operator of the system with computer capabilities for unfolding the volume image of the dental arch to provide panoramic images from the computed tomography image input. This approach takes advantage of human skills of creativity, use of heuristics, flexibility, and judgment, and combines these with computer advantages, such as speed of computation, capability for exhaustive and accurate processing, and reporting and data access capabilities.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings, in which.

DETAILED DESCRIPTION OF THE INVENTION

In the following detailed description of embodiments of the present invention, reference is made to the drawings in which the same reference numerals are assigned to identical elements in successive figures. It should be noted that these figures are provided to illustrate overall functions and relationships according to embodiments of the present invention and are not provided with intent to represent actual size or scale.

In the context of the present invention, the descriptive term "object of interest" generally indicates an object or a portion of anatomy such as a tooth.

The term "set", as used herein, refers to a non-empty set, as the concept of a collection of elements or members of a set is widely understood in elementary mathematics. The term "subset", unless otherwise explicitly stated, is generally used herein to refer to a non-empty proper subset, that is, to a subset of the larger set, having one or more members. For a set S, a subset may comprise the complete set S. A "proper subset" of set S, however, is strictly contained in set S and excludes at least one member of set S.

The subject matter of the present invention relates to digital image processing and computer vision technologies, which is understood to mean technologies that digitally process data from a digital image to recognize and thereby assign useful meaning to human-understandable objects, attributes, or conditions, and then to utilize the results obtained in further processing of the digital image.

Figure 1:
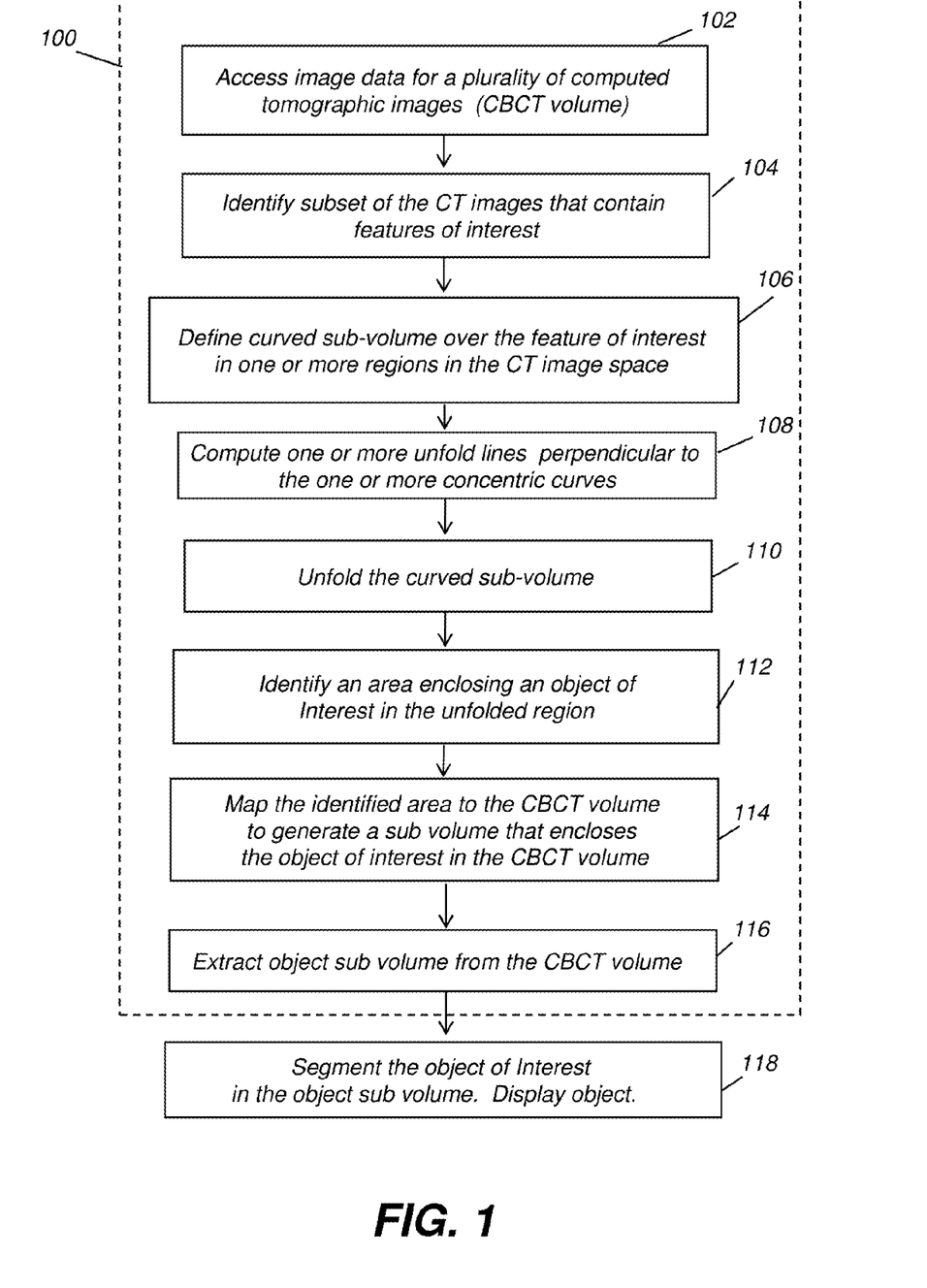
FIG. 1 is a logic flow diagram showing processes of the present invention in one embodiment.

Referring to the logic flow diagram of FIG. 1, there is shown a sequence of steps used for tooth segmentation for a dental CBCT volume image according to one embodiment of the present invention. A sequence of steps is grouped as an object sub-volume extraction step 100, shown in dashed outline, followed by a segmentation step 118. As part of this sequence, the CBCT volume, also termed a CT volume herein, is acquired in an image data acquisition step 102. A CT volume contains image data elements for one or more images (or equivalently, slices). As each image slice is obtained, image data elements are 2-D pixel elements. For the reconstructed volume image, image data elements are 3-D voxel elements. An original reconstructed CT volume is formed using standard reconstruction algorithms known in the art, using multiple projections or sinograms obtained from a CT scanner. Normally, only a fraction or subset of the images that form the volume contain teeth or other high density features of interest and is selected for processing; the rest of the CT reconstructed volume accurately represents soft tissue or air.

Continuing with the sequence of FIG. 1, the identification of a subset of images for this procedure is done in an image selection step 104. A number of neighboring high density objects or other features of interest in an image (or slice) forms a first region. Similarly, a number of neighboring high density objects or other features of interest in another image (or slice) forms another region.

Figure 2:
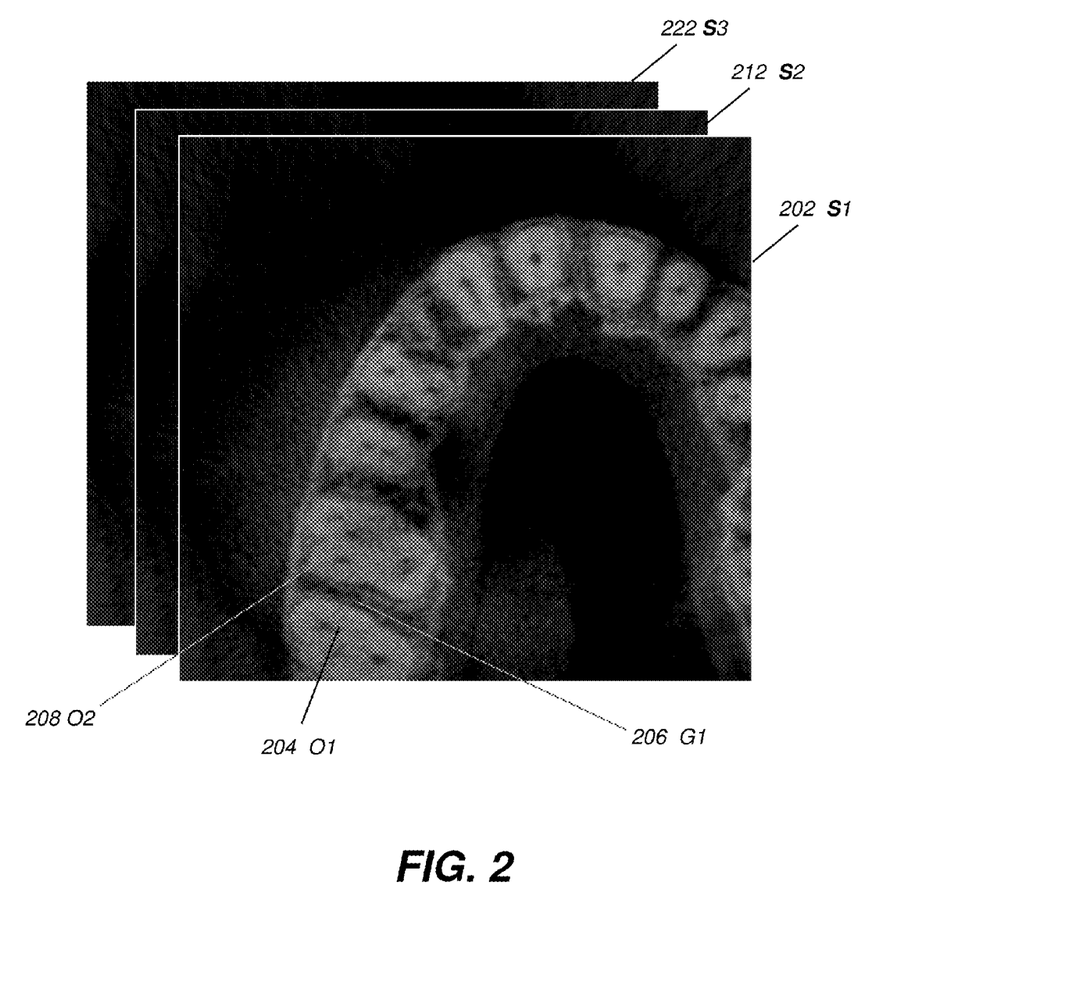
FIG. 2 is a view of a set of reconstructed CBCT images having features of interest.

FIG. 2 shows an exemplary dental CBCT volume that contains three slices (S1 202, S2 212, and S3 222) considered from a top view with respect to the teeth. Examples of high density objects are teeth O1 204 and O2 208 shown in slice S1 202. Here, objects O1 204 and O2 208 are parts of two neighboring teeth. All of these high density objects including O1 and O2 in slice S1 constitute a region in slice S1. Similarly, high density objects like O1 and O2 in slice S2 constitute a region in slice S2. The same applies to slice S3.

Figure 3A:
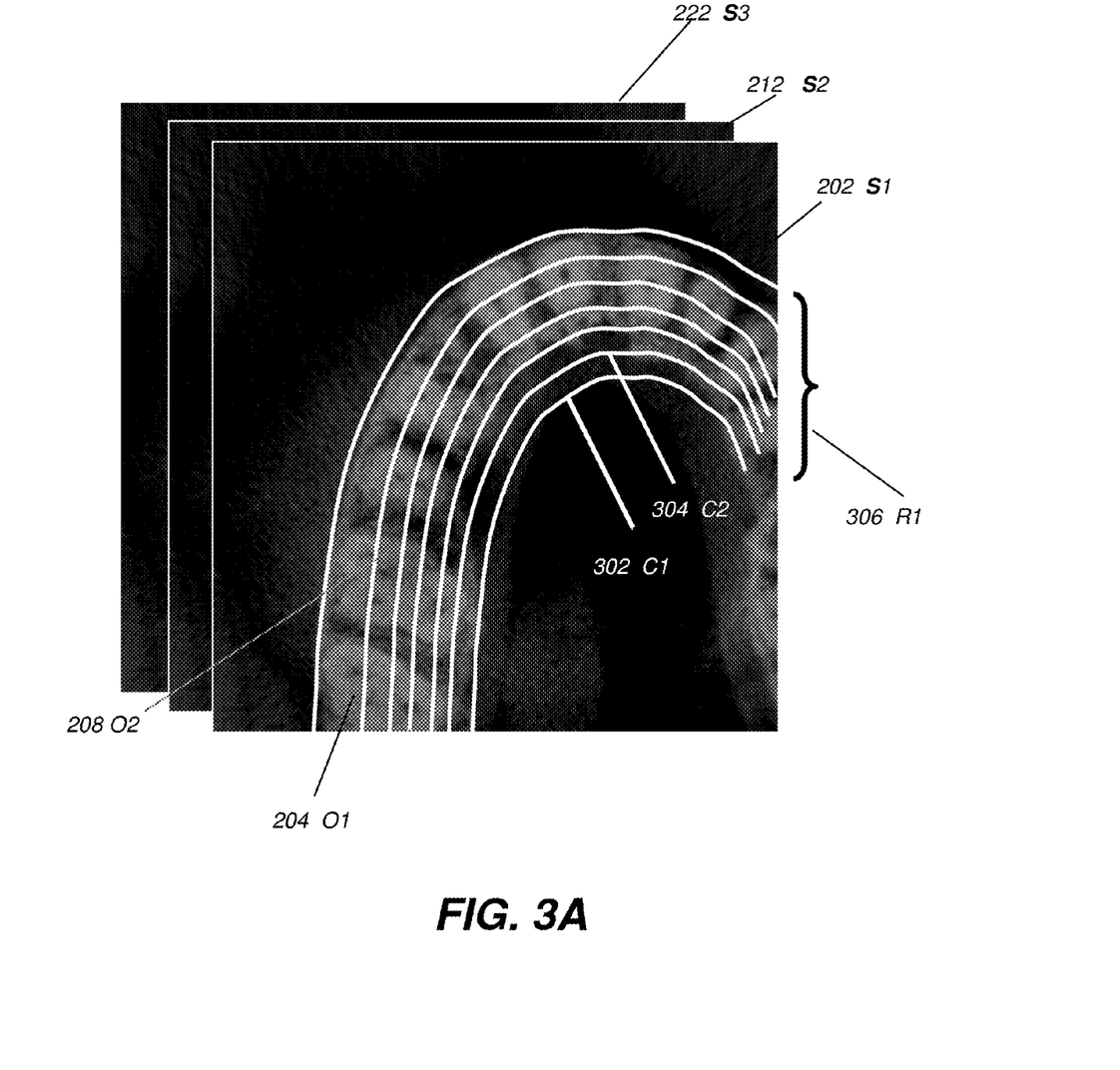
FIG. 3A is a view of a set of reconstructed CBCT images having features of interest with concentric curves overlaid.

As is shown in slice S1, the features of interest include high density objects (teeth in this case) collectively arranged along a geometrically curved arcuate or arch shape. This shape can be traced by defining a set of substantially concentric curves as shown in FIG. 3A. Exemplary concentric curves including curve C1 302 and curve C2 304 are shown in slice S1 202. When forming a set of concentric curves in this way, the curves should enclose, cover, or define the features of interest. In the example of FIG. 3A, these curves define the region that is constituted of high density objects, teeth in this case. An exemplary region R1 306 is shown in slice S1. Similarly, although not visible in the arrangement of slices in FIG. 3A, another exemplary region is similarly formed in slice S2, or slice S3 and other image slices S4, S5, . . . Sk taken from this perspective.

A path in a plane is considered to be concentric if there is a point c such that any two distinct points on the curve, p1 and p2, are not collinear. If one considers the plane in polar coordinates (r, θ) and Θ is a closed connected subset of [0, $2\pi$], then a continuous mapping $f:\Phi \to R^+$ will produce a concentric path. This can be extended in an obvious manner to an axially concentric surface in a volume. A path is considered to be concentric about a point c if for any two points on the path, $p_1$ and $p_2$, the line segments, $s_1$ and $s_2$ from $p_i$ to c, i=1.2; do not intersect. Substantially concentric paths conform to this definition over most of their respective lengths.

Therefore, referring back to the sequence of FIG. 1, in a curved sub-volume definition step 106, the curvature of the dental arch is detected and used as a feature to form a curved or curved arch sub-volume for assisting in tooth segmentation. In this step, one or more substantially concentric curves are formed, traced, or otherwise identified over at least the feature or features of interest. As shown schematically in FIG. 3B, by stacking the regions that are defined along these concentric curves, that is, stacking of region R1 306 from slice S1 in FIG. 3A and corresponding regions R2, R3, . . . Rk from slices S2, S3, . . . Sk that would be defined in the same way, a curved slab can be formed as an curved sub-volume 130, containing one or more of the features of interest, here, regions of one or more high density objects cropped from the larger image volume.

Figure 3B:
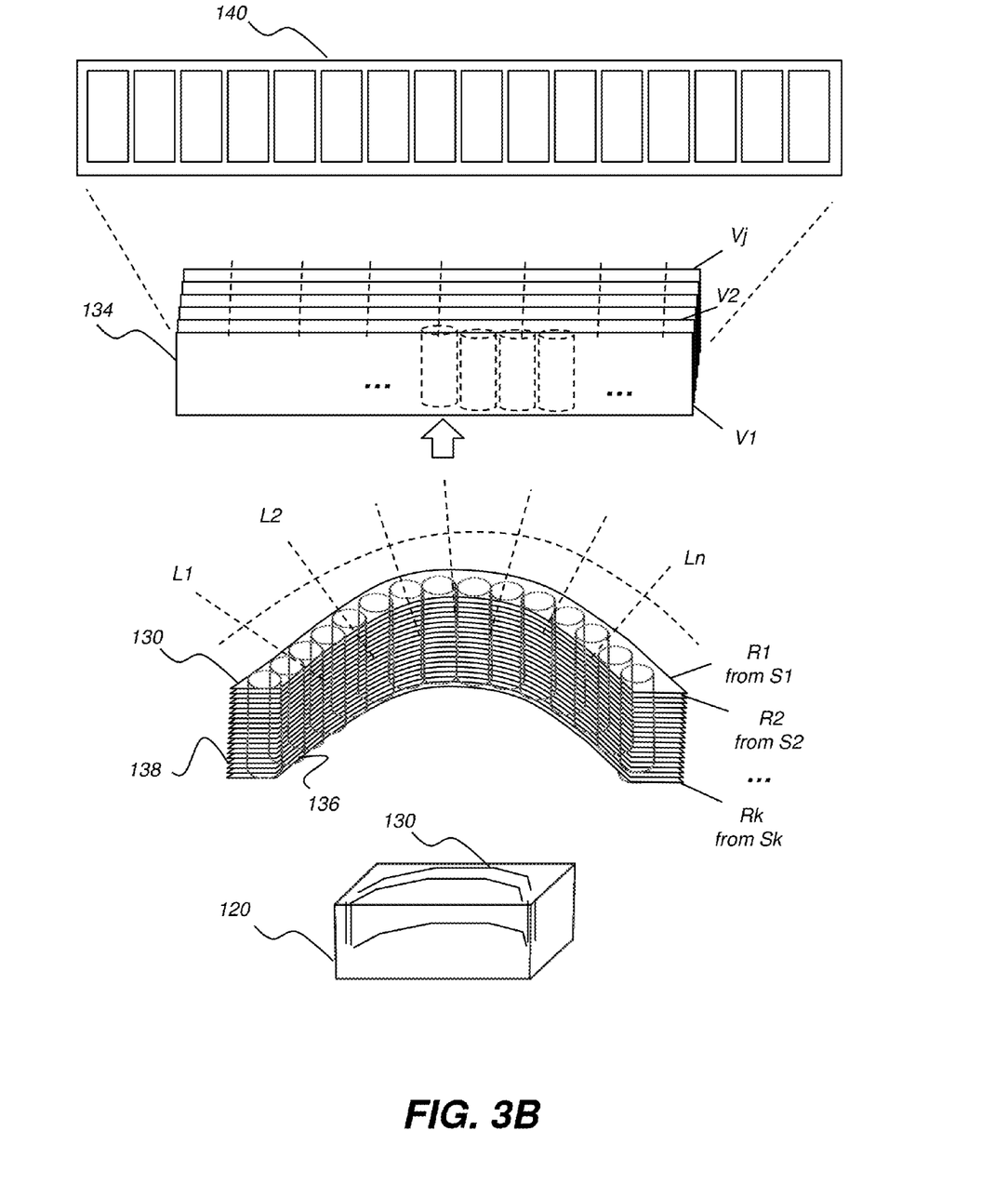
FIG. 3B is a schematic diagram that shows how a panoramic image is formed by unfolding a curved sub-volume.

The diagram of FIG. 3B shows schematically how the segmentation sequence of the present invention proceeds to generate one or more panoramic views 140 from a dental CT volume 120. A first set of operations, through step 106 in FIG. 1, generate the curved slab of curved sub-volume 130 from the original CT volume 120. An unfold line computing step 108 then provides a utility that will be used subsequently for unfolding the curved sub-volume 130 along a selected curve to generate the desired flattened or unfolded panoramic view 140. As the sequence shown in FIG. 3B indicates, the curved sub-volume 130 is formed by stacking slices aligned generally along a first direction. Unfolding then operates in a planar direction that is orthogonal to this first direction, as shown in the view of an unfolded slab, termed an unfolded sub-volume 134. For unfolding, image data elements that lie along or nearby each fold line are re-aligned according to a realignment of the fold lines. This realignment generally aligns the fold lines from their generally radial arrangement to a substantially parallel orientation. Image data elements that were initially aligned with the fold lines in the original, generally radial arrangement follow the fold line re-orientation, effectively "flattening" the curved sub-volume with little or no distortion of the tooth and its position relative to other teeth.

Unfolded sub-volume 134 can be visualized as a stacked series of vertical slice images V1, V2, . . . Vj, as shown. Each vertical slice provides a panoramic image obtained at some depth within unfolded sub-volume 134. Subsequent steps then present the unfolded views to the user as a type of index to the volume that is to be segmented. That is, selection from the unfolded view enables the user to provide hint information that is used for the subsequent segmentation of the tooth or other object.

The one or more concentric curves or curved paths in FIG. 3A could be traced using an automated approach or a semi-automatic approach. In an automated approach, the slice S1 can be processed through a sequence of steps that include noise filtering, smoothing, intensity thresholding, binary morphological filtering, medial curve estimation, and pruning to identify a first curve that fits or approximates the arch shape of the teeth region. Subsequent concentric curves can then be defined using the shape and position of the first estimated curve as a starting point. These steps described are exemplary steps that are well known to those skilled in the art; other manual and automated processing steps could alternately be performed for providing a structure and sequence to support unfolding.

For a semi-automatic approach, which can be simple and robust by comparison with automated processing, user entries initialize a few nodes along an imaginary medial curve along the arch shape region in slice S1, for example. These few nodes then become the starting points for a curve fitting algorithm, such as a spline fitting algorithm, for example, to form a first curve that fits or approximates the arch shape of the teeth region. Subsequent concentric curves for defining the curved sub-volume can then be developed using the first estimated curve. Those skilled in the art will recognize that these steps are exemplary and that suitable results for identifying the curved sub-volume of the dental arch could be obtained in a number of alternate ways.

Figure 4:
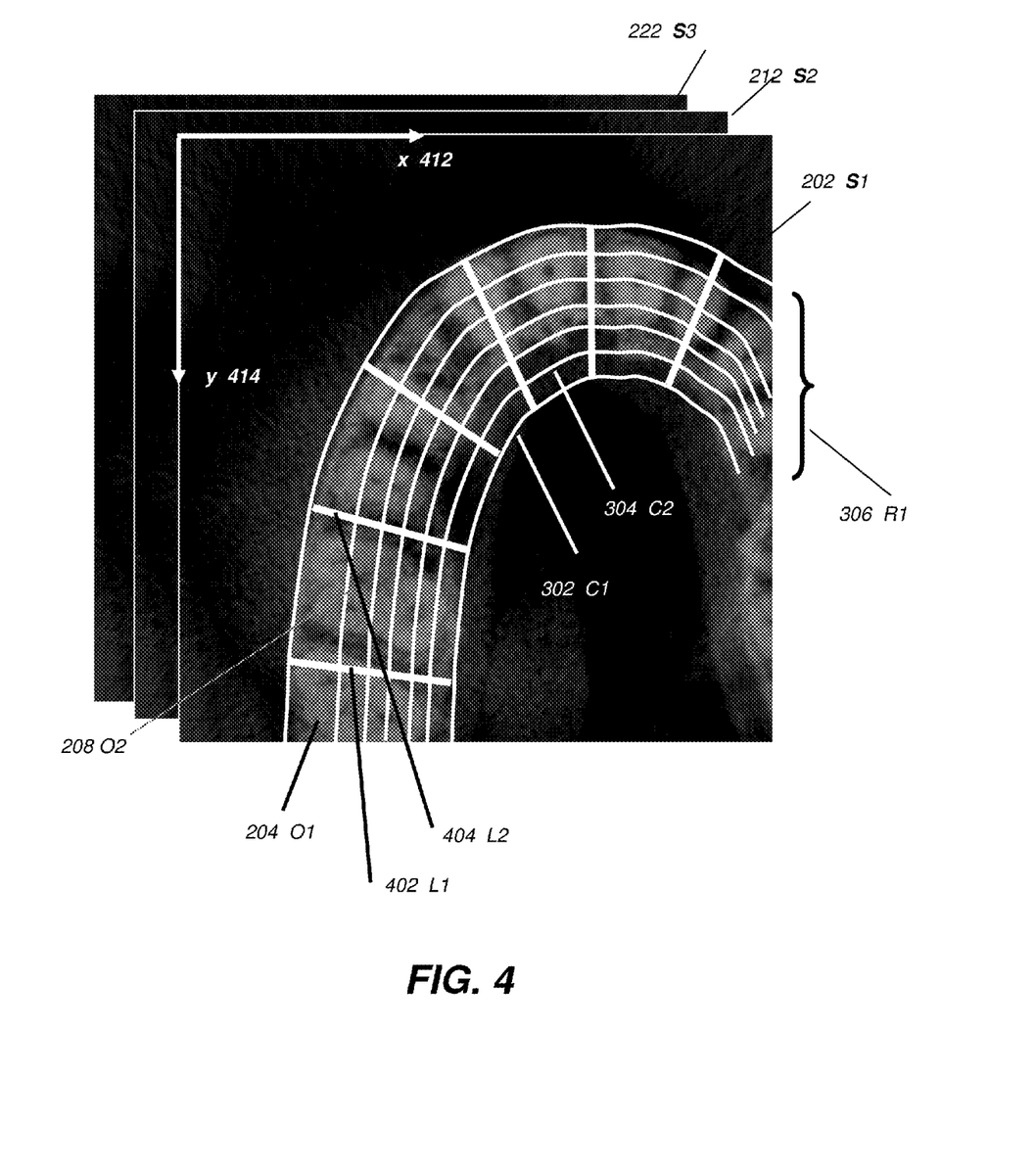
FIG. 4 is a view of a set of reconstructed CBCT images having objects of interest with concentric curves and lines perpendicular to the concentric curves overlaid.

Forming curved sub-volume 130 helps to reduce the amount of data that must be processed for segmentation of the tooth or other object, but the arch or curved sub-volume itself is difficult to work with for identification of an object in segmentation processing. As noted previously, after defining curved sub-volume 130 using one or more concentric curves, the next step in FIG. 1 is an unfold line computing step 108. In this step, a series of unfold lines L1, L2, . . . Ln are defined for facilitating the unfold operation. In one embodiment of the present invention, unfold lines L1, L2, . . . Ln are generated using the same set of concentric curves that were used to define curved sub-volume 130. Each unfold line is substantially perpendicular, that is, perpendicular to within +/−8 degrees, at its intersection to concentric curves in the tomographic image space of curved sub-volume 130. Exemplary perpendicular unfold lines are shown as lines L1 402 and L2 404 in FIG. 4. In practice, best resolution and results for unfolding are typically provided using multiple unfold lines that are closely spaced apart. FIGS. 3B and 4 show only a few representative unfold lines for better visibility and description. Unfold lines are projected generally radially outward across curved sub-volume 130, so that each unfold line extends at least from an inside curved surface 136 to an outside curved surface 138 as shown in FIG. 3B. In extending across curved sub-volume 130, each unfold line intersects a number of image data elements, voxels (in 3-D representation) or pixels (in 2-D representation), that will subsequently be re-aligned in the unfolding operation that follows.

It is easily understood that two neighboring perpendicular unfold lines could touch or intersect at one end, within curved sub-volume 130, but be spaced further apart at the other end, such as by examining the exemplary perpendicular unfold lines shown in slice S1 in FIG. 4. It can also be noted that perpendicularity of the unfold lines to one or more curves can be advantageous, providing a configuration that allows a symmetric unfolding operation. A list of the unfold lines generated is saved for use in remapping in a subsequent step.

Alternatively, a medial curve, that is, a curve substantially centered within the arch shape region in slice S1, is itself sufficient for use in defining a plurality of unfold lines, such as lines L1 402 and L2 404 in FIG. 4, with each unfold line perpendicular to the medial curve of the arch-shaped region in S1.

Unfolding Sequence

The next step in the segmentation processing sequence of FIG. 1 "unfolds" the curved sub-volume obtained in step 106, realigning voxels (pixels) using the perpendicular unfold lines L1, L2, . . . Ln computed in step 108. In an unfolding step 110, the curved slab of the curved sub-volume 130, containing one or more of the regions of one or more high density objects, is unfolded with the help of the computed unfold lines L1, L2, . . . Ln perpendicular to the concentric curves.

In the unfolding operation, points along the perpendicular unfold lines are used as reference points for identifying how the image data from the curved sub-volume 130 is to be aligned in the unfolded view. One sequence of operations for unfolding the curved sub-volume is as follows:

(i) Define an x-y coordinate system for slice S1 as shown by an x direction 412 and y direction 414 in FIG. 4, with an origin at the upper left corner of slice S1 202 or other suitable location. Suppose there are a total of M concentric curves (C1, C2, . . . Cm, . . . CM), and total of N perpendicular lines (L1, L2, . . . Ln, . . . LN).

(ii) Denote an x position matrix of size M×N by X. Denote a y position matrix of size M×N by Y.

(iii) Store the x position of an intersection point of Cm and Ln at matrix position X(m,n). The y position of the intersection point of Cm and Ln is stored at Y(m,n).

(iv) Denote an arbitrary slice by S with the same x–y (x 412 and y 414) coordinate system defined in FIG. 4.

(v) Denote an arbitrary intensity image by U of size of M×N. Define:

$$U(m,n)=S(Y(m,n),X(m,n)).$$

Therefore, for a specific slice:

$$U1(m,n)=S1(Y(m,n),X(m,n)),$$

$$U2(m,n)=S2(Y(m,n),X(m,n)),$$

$$U3(m,n)=S3(Y(m,n),X(m,n)),$$

. . . .

$$UK(m,n)=SK(Y(m,n),X(m,n)),$$

wherein K is the number of slices that constitute the CBCT volume, in the direction of slices Sk, where k=1 . . . K, contained in the unfolded curved slab of the curved sub-volume 130, as was shown in FIG. 3B. Collectively, the intensity images U1, U2, U3, and UK formed and stacked in this way constitute an unfolded sub-volume 134.

Figure 5:
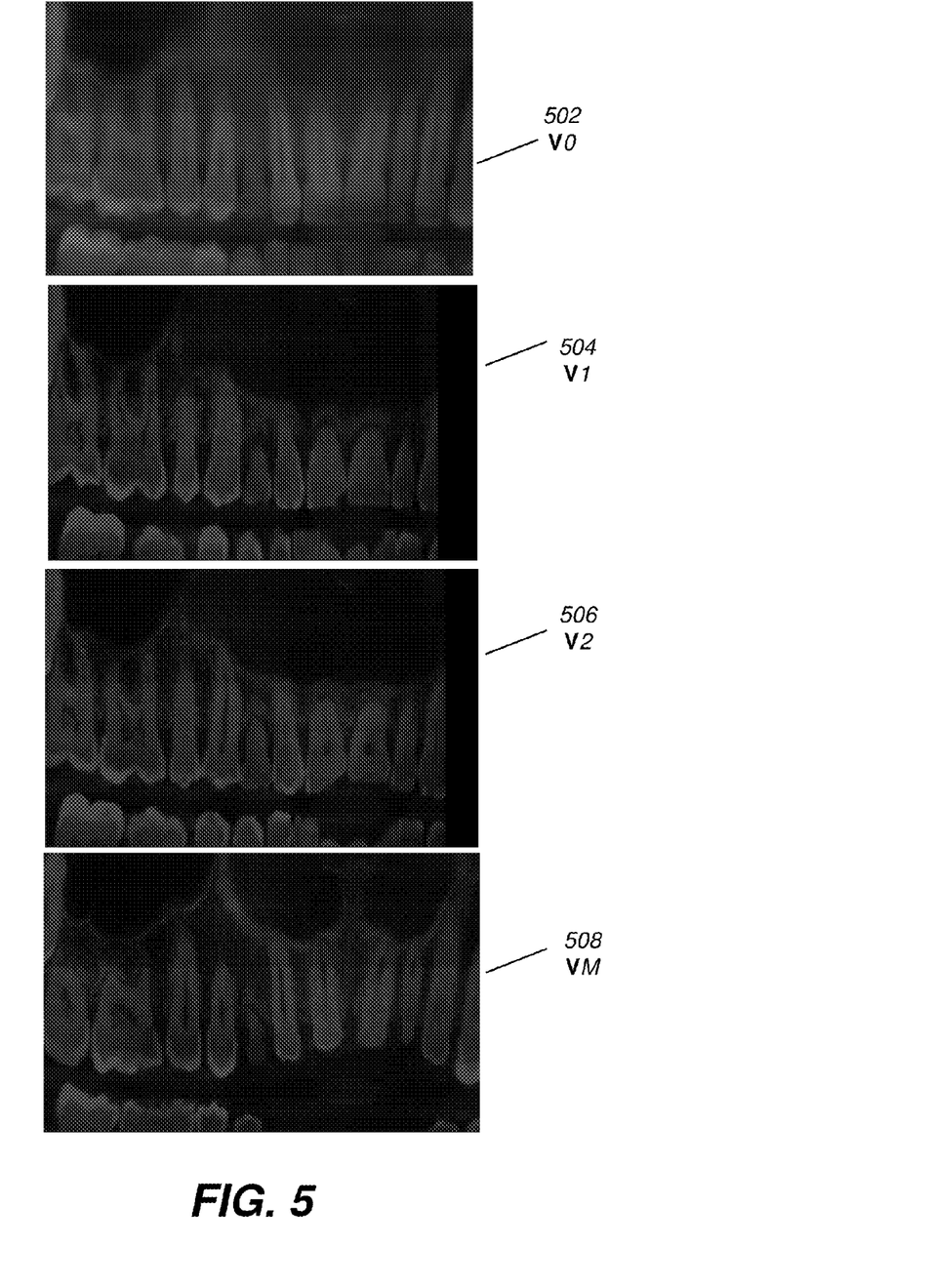
FIG. 5 shows a plurality of panoramic images of an unfolded curved slab that is formed by the regions covered by the concentric curves.

The same unfolded sub-volume 134 can be represented as a stack of images, in an orthogonal direction, of the original stacked plane. That is, the curved sub-volume 130 in FIG. 3B could alternately be considered as shown in unfolded sub-volume 134 and in FIG. 5, as a stack of vertical slice images V1, V2, . . . VM. Each of these VM stacked images has a dimension of K×N. Images V1 (504), V2 (506) . . . VM (508) in FIG. 5 are referred to as panoramic images.

Embodiments of the present invention not only provide the unfolding method for obtaining individual panoramic images as vertical slice images Vm, but also combine the individual images to form a composite vertical slice image V0, formed by averaging, summing, or otherwise combining the individual vertical slice images V1, V2, . . . VM, that can be useful for improved segmentation processing.

In at least one embodiment, composite vertical slice image V0 is formed as an average, using:

$$V0=(V1+V2+\ldots+VM)/M.$$

By way of example, an actual computed example of image V0 (502) is shown in FIG. 5.

In another embodiment, any vertical slice image Vm, m=1 . . . M, could be a composite vertical slice image, formed using $V_m=f(\{V_{m1}, \ldots V_{mn}\})$, where f is an operation that could be a moving average, median average, or other suitable linear or nonlinear operation, wherein $\{V_{m1}, \ldots V_{mn}\} \subseteq \{V_1, \ldots V_M\}$.

Identifying an Object Sub-Volume

Once unfolded sub-volume 134 has been generated, operator interaction assists an automated process in order to define an object sub-volume that includes a single tooth or other object to be segmented.

It is observed from the unfolded panoramic views of FIG. 5 that the high density objects (teeth) in the different images V1, V2, . . . VM are aligned approximately along a straight line (all visible in the same image, e.g. V0) instead of along a curved axis as in the original slices shown in FIG. 2. Referring back to the sequence of FIG. 1, an area identification step 112 identifies an area enclosing an object of interest in the unfolded region. This provides information that is needed for identifying an object sub-volume. Step 112 can be executed in a straightforward manner with a computer or other processor by displaying the planar, unfolded image (for example, displaying composite image V0), and obtaining, from operator instructions, spatially and geometrically meaningful information regarding the object of interest.

Figure 6A:
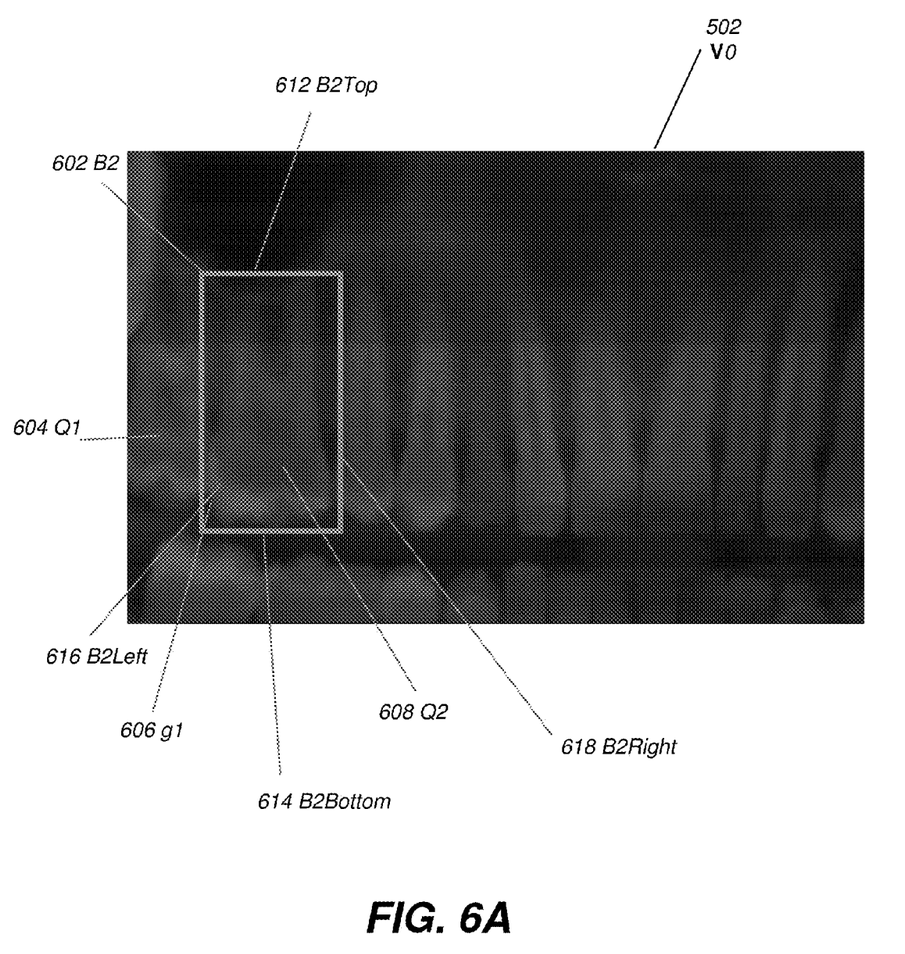
FIG. 6A is a view of a panoramic image with a bounding box that indicates the area of an object of interest.

In at least one embodiment, the operator provides information that outlines a particular tooth from the composite image, using a pointing device such as a computer input device, mouse, or other pointer or on a touch screen display, for example. In one embodiment, the operator defines a bounding box surrounding the tooth or other object; however, other outlining and selection shapes or inputs could alternately be used for this purpose. By way of example, FIG. 6A shows a bounding box B2 (602) enclosing a tooth Q2 (608) displayed in image V0 (502). Note that tooth Q2 corresponds to object O2 (208) in FIG. 2. Accordingly, neighboring object O1 (204) in FIG. 2 becomes tooth Q1 (604).

Although there are advantages in providing bounding box or other outline information in composite image V0, this location definition can also be entered using any of the other panoramic images of vertical slices V1, V2, . . . VM of FIG. 5. As shown in the sequence of FIG. 1, this bounding box B2 is used in a mapping step 114 for mapping the identified area to the CBCT volume to generate a sub-volume that encloses the object of interest (that is, O2) in the CBCT volume constituted by slices S1, S2, S3 . . . etc. in FIG. 2. The top edge position of the bounding box B2 in FIG. 6A is denoted by B2Top (612), the bottom edge position by B2Bottom (614), the left edge position by B2Left (616), and the right edge position by B2Right (618). The gap G1 (206) in FIG. 2 is denoted by g1 (606) in FIG. 6A.

Figure 6B:
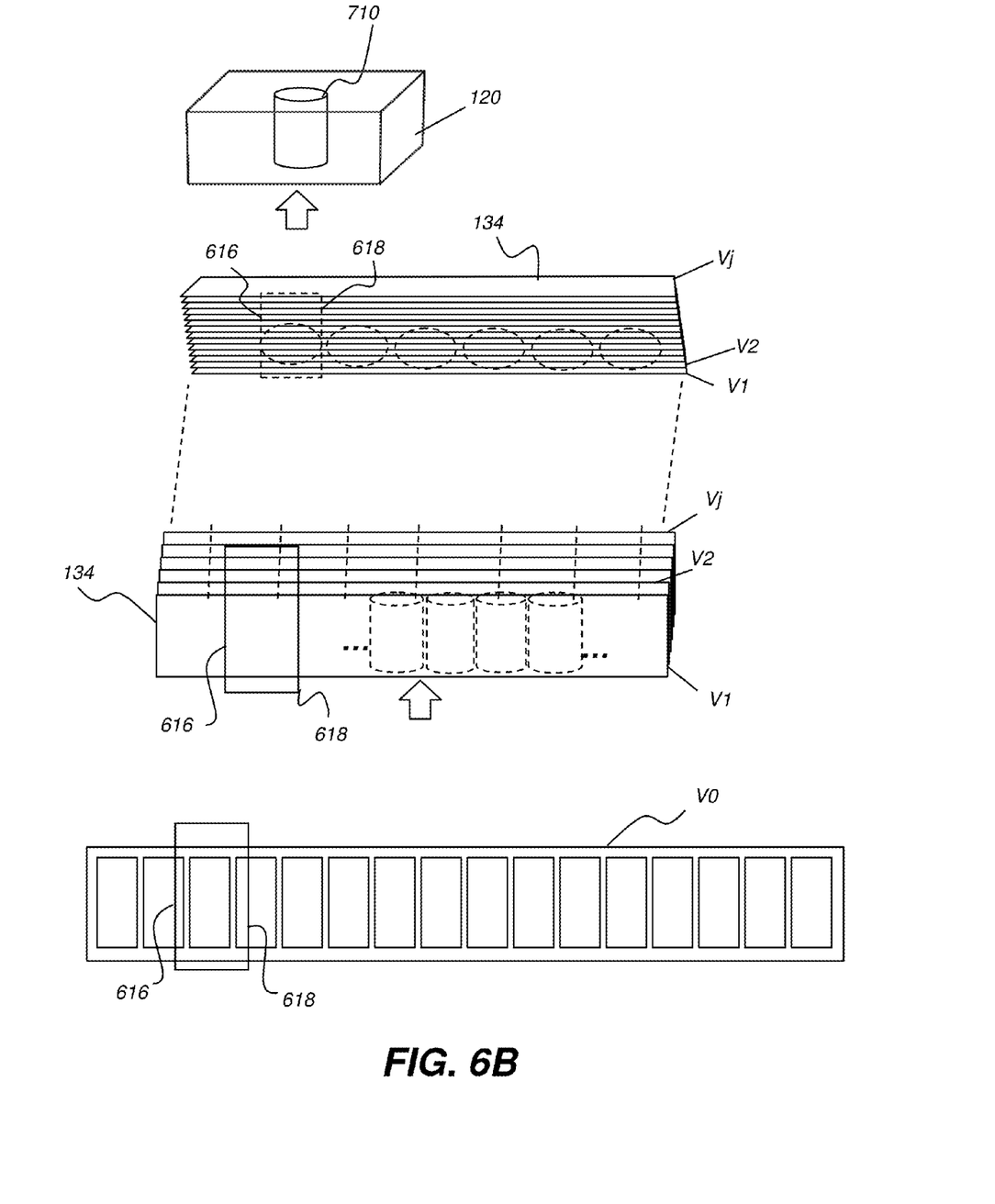
FIG. 6B is a schematic diagram that shows the use of a bounding box for identifying an object sub-volume from a composite panoramic image.
Figure 7:
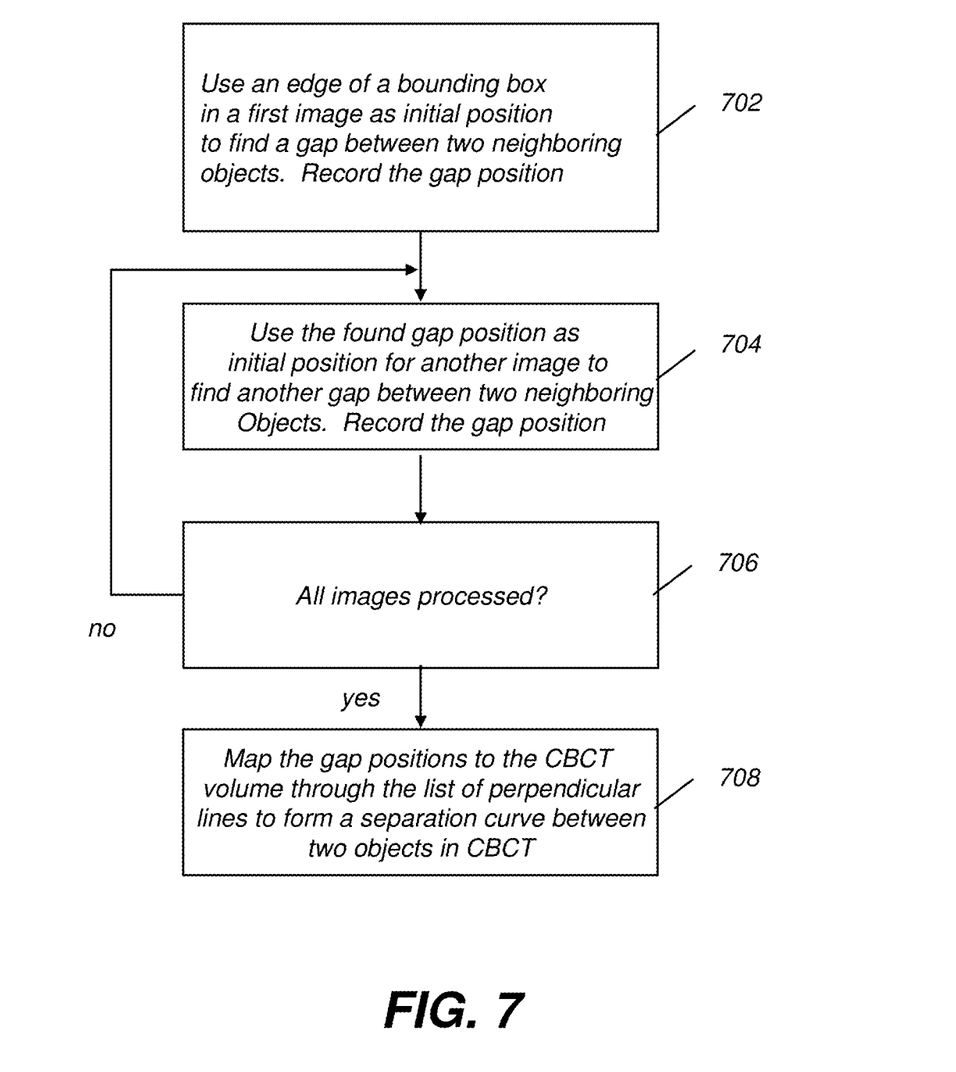
FIG. 7 is a flowchart showing processes of mapping area of an object of interest to CBCT images.

The schematic diagram of FIG. 6B shows, from top and side views, how bounding box edges are used to help define an object sub-volume 710 that encloses an object. Bounding box edges help to define starting points for algorithmic techniques that detect gaps indicating edges between teeth. For this purpose, mapping step 114 of the FIG. 1 sequence begins using the left and right edge positions to find gaps between neighboring the teeth or other objects. FIG. 7 depicts the work flow of such an operation, consistent with an embodiment of the present invention. In a gap detection step 702, an edge (e.g. B2Left in FIG. 6A) is used as an initial position in a first panoramic image (e.g. V1) to find a gap position between two neighboring objects (e.g. Q1 and Q2). The gap position is recorded. This initial gap position is then used as a starting point in a subsequent gap detection step 704 that detects another gap position between two objects in the next panoramic image (e.g. V2). The newly found gap position is similarly recorded. This process of searching for gaps between neighboring objects in panoramic images repeats, working successively through each vertical slice image Vn in unfolded sub-volume 134. A decision step 706 determines whether or not all vertical slice images are processed.

Continuing with the FIG. 7 sequence, in a mapping step 708, the recorded gap positions are mapped back to the CBCT volume space to form a first separation curve between two objects in the CBCT volume, defining the border between the two teeth or other objects. The perpendicular lines (L1, L2, . . . Ln, . . . LN) that were obtained as described with reference to FIG. 4 are used in the mapping process.

Figure 8:
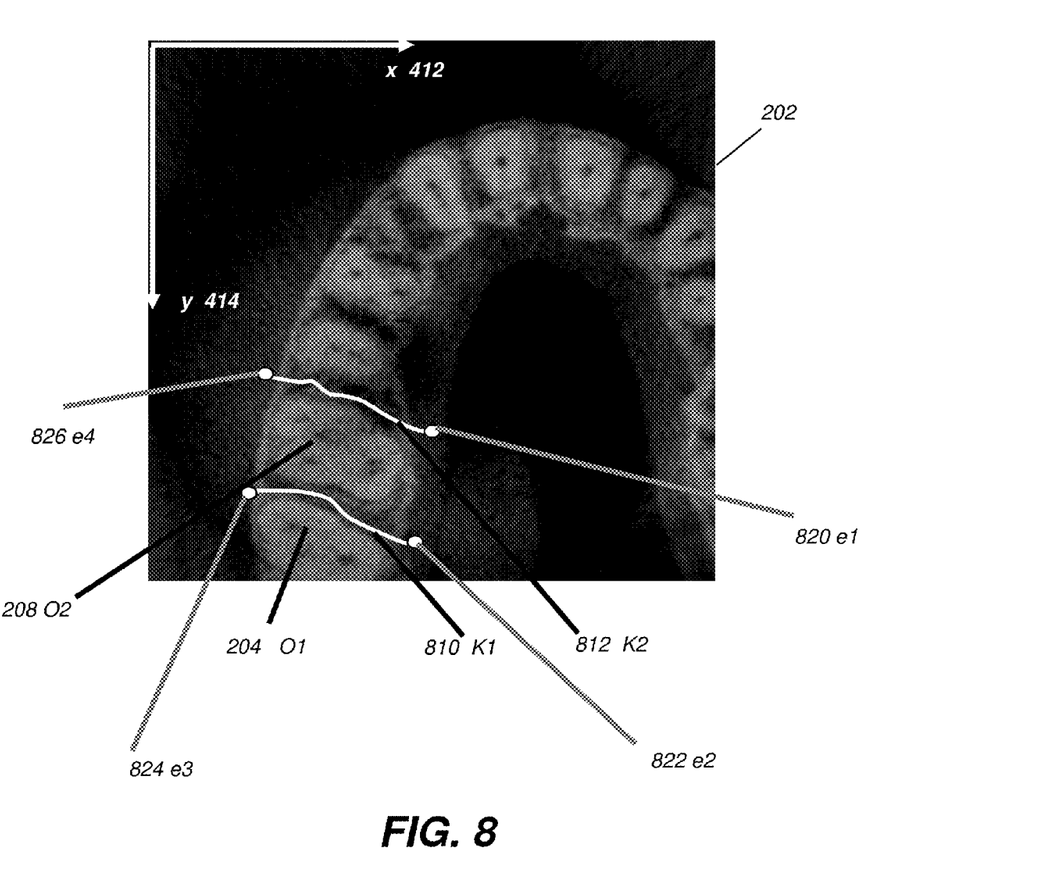
FIG. 8 is a view of one of the CBCT images with the mapped separation curves.

The above steps 702 through 708 of FIG. 7 are then repeated, applied to another edge (e.g. B2Right in FIG. 6A) to find another separation curve in the CBCT space. Continuing with this example, FIG. 8 shows two exemplary separation curves K1 810 and K2 812 formed in this manner. The four end points e1 (820), e2 (822), e3 (824), and e4 (826) determine four position vectors (x1, y1), (x2, y2), (x3, y3) and (x4, y4). To extract a sub-volume (denoted by SV), four parameters in x-y space need to be defined, namely, xLeft, xRight, yTop, yBottom. These four parameters can be obtained through simple computation, for example:

$$xLeft=\min(x1,x2,x3,x4),$$

$$xRight=\max(x1,x2,x3,x4),$$

$$yTop=\min(y1,y2,y3,y4),$$

$$yBottom=\max(y1,y2,y3,y4),$$

where the min( ) operation selects a minimum value from the entries, while max( ) selects a maximum value from the entries.

In mapping step 114 of FIG. 1, the positions of B2Top and B2Bottom are also mapped back to CBCT space. Note that B2Top>=1 and B2Bottom<=K, where K is the number of slices in the CBCT volume. Denote a z-axis direction of the CBCT volume by z (that is, pointing into the paper in FIG. 8). The mapping of B2Top and B2Bottom to CBCT space then generates:

$$zTop=B2Top+zOffset; \text{ and}$$

$$zBottom=B2Bottom+zOffset,$$

where $1<=zOffset<<K$ depending on how curved sub-volume 130 for the arch is selected.

Next in the FIG. 1 sequence, an extraction step 116 extracts an object sub-volume (SV) 710 that encloses the object of interest. This object sub-volume is generated by executing the following:

$$SV=CBCT(xLeft,xRight,yTop,yBottom,zTop,zBottom),$$

where CBCT( ) operation extracts a sub-volume SV from the CBCT volume using the six parameters xLeft, xRight, yTop, yBottom, zTop, zBottom. As is shown in FIG. 6B, object sub-volume 710 is then used to obtain data from CT volume image 120.

Figure 9:
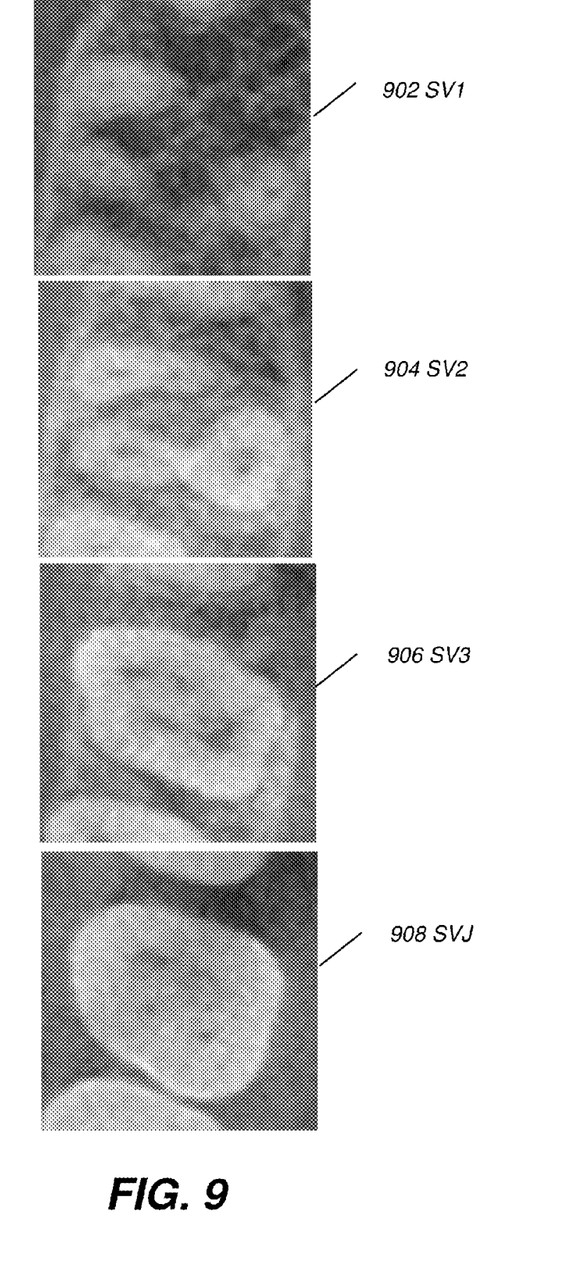
FIG. 9 shows a plurality of images of a sub-volume that contains an object of interest.

Exemplary slices of the sub-volume SV are shown in FIG. 9 as slices SV1 (902), SV2 (904), SV3 (906), and SVJ (908), where J=zBottom−zTop+1.

Figure 10:
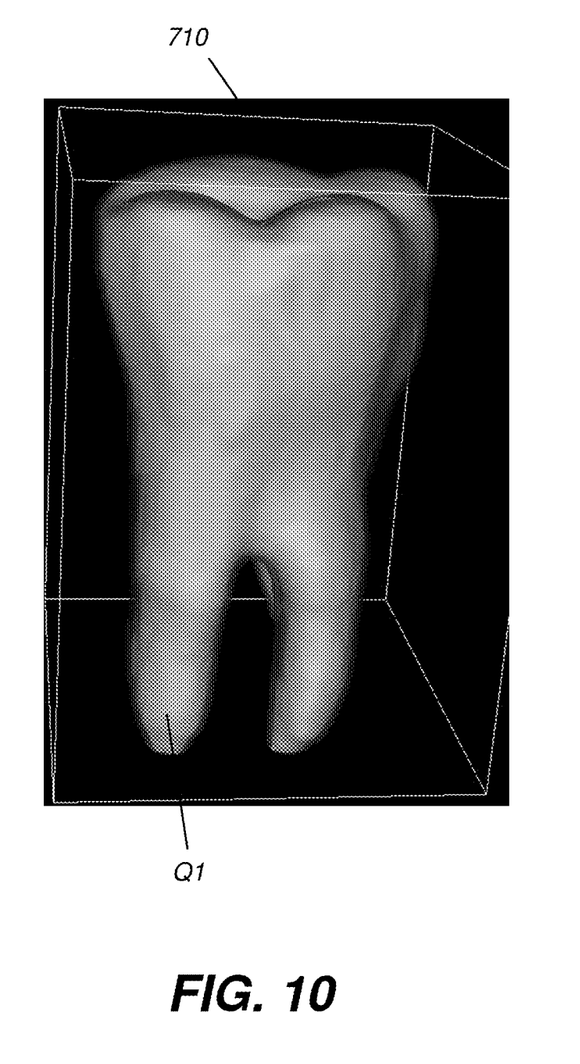
FIG. 10 is a view that shows segmentation results for an example tooth.

Referring back again to the FIG. 1 sequence, following the extraction of the sub-volume the segmentation of the object of interest is carried out in a segmentation step 118. A number of segmentation methods are available for this purpose and are known to those skilled in the image analysis and processing arts. Display of the segmented tooth generally follows segmentation. An exemplary tooth segmentation result of the present invention is presented in FIG. 10.

Embodiments of the present invention provide a practical tooth segmentation system that takes advantage of synergistic integration of human operator skills, such as creativity, use of heuristics, flexibility, and judgment, with a computer's computational power, speed, capability for exhaustive and accurate processing, reporting, and data access, storage capabilities, and display flexibility.

Consistent with one embodiment, the present invention utilizes a computer program with stored instructions that perform on image data accessed from an electronic memory, to provide panoramic presentation and tooth segmentation in accordance with the method described. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including networked processors. The computer program for performing the method of the present invention may be stored in a computer readable storage medium. This medium may comprise, for example; magnetic storage media such as a magnetic disk (such as a hard drive) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It is noted that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail with particular reference to presently preferred embodiments, but it will be understood that variations and modifications can be effected that are within the scope of the invention. For example, the operator could enter equivalent bounding box information in any of a number of ways, including pointing to a particular tooth or other object using a touch screen or making a text entry on a keyboard, for example. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for forming a panoramic image from a computed tomography image volume, comprising:

acquiring image data elements for one or more computed tomographic volume images of a subject;

identifying a subset of the acquired computed tomographic images that include one or more high density features of interest;

defining, from the subset of the acquired computed tomographic images, a sub-volume having a curved shape that includes one or more of the high density features of interest;

defining a set of unfold lines wherein each unfold line extends at least between two curved surfaces of the curved shape sub-volume;

re-aligning the image data elements within the curved shape sub-volume according to a re-alignment of the set of unfold lines to form a unfolded curved sub-volume; and displaying one or more views of the unfolded curved sub-volume.

2. The method of claim 1 wherein acquiring the image data elements comprises obtaining a set of cone-beam computed tomography images of tooth structures.

3. The method of claim 1 wherein defining the sub-volume comprises identifying a dental arch.

4. The method of claim 1 wherein defining the sub-volume comprises defining two or more substantially concentric curves over the subset of acquired images that includes the one or more features of interest.

5. The method of claim 4 wherein defining the set of unfold lines comprises defining unfold lines substantially perpendicular at their intersections with the two or more substantially concentric curves.

6. The method of claim 1 wherein displaying the one or more views of the unfolded sub-volume comprises displaying a composite view formed as a combination of two or more image slices.

7. The method of claim 1 further comprising accepting an operator instruction that outlines an object of interest relative to the unfolded sub-volume.

8. The method of claim 1 further comprising:
accepting an operator instruction that outlines an object of interest relative to the unfolded sub-volume;
forming an object sub-volume that includes the object of interest; and
segmenting the object of interest from within the object sub-volume.

9. The method of claim 8 wherein accepting an operator instruction comprises displaying an outline defined by the operator.

10. A method for forming a panoramic image of the teeth from a computed tomography image volume, the method executed at least in part on a computer and comprising:
acquiring image data elements for one or more computed tomographic volume images of a patient's teeth;
identifying acquired computed tomographic images that includes a dental arch;
defining, from the acquired computed tomographic images that includes the dental arch, a curved sub-volume that includes the dental arch;
defining a plurality of unfold lines wherein each unfold line extends at least from an inside surface to an outside surface of the curved sub-volume;
unfolding the curved sub-volume by re-aligning the image data elements according to a re-alignment of the unfold lines;
displaying one or more views of the unfolded curved sub-volume;
accepting an operator instruction that outlines a tooth of interest relative to the unfolded curved sub-volume;
forming an object sub-volume that includes the tooth of interest according to the operator instruction;
segmenting the tooth of interest from within the object sub-volume; and
displaying the segmented tooth of interest.

11. The method of claim 10 wherein defining a curved sub-volume that includes the dental arch comprises defining two or more substantially concentric curves over the subset of acquired images that includes the dental arch.

12. The method of claim 10 wherein defining the curved sub-volume comprises identifying two or more concentric curves over the teeth.

13. The method of claim 12 wherein defining the plurality of unfold lines comprises defining one or more lines that are perpendicular to the two or more concentric curves.

* * * * *